(12) United States Patent
Sakaki et al.

(10) Patent No.: US 7,266,625 B2
(45) Date of Patent: Sep. 4, 2007

(54) DATA COMMUNICATION SYSTEM

(75) Inventors: Seiji Sakaki, Osaka (JP); Hisataka Imakurusu, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 174 days.

(21) Appl. No.: 11/041,276

(22) Filed: Jan. 25, 2005

(65) Prior Publication Data
US 2005/0165997 A1 Jul. 28, 2005

(30) Foreign Application Priority Data
Jan. 26, 2004 (JP) ............... P. 2004-016623

(51) Int. Cl.
*G06F 15/177* (2006.01)
(52) U.S. Cl. .................. 710/104; 713/1
(58) Field of Classification Search ............ 710/10, 710/104; 713/1; 709/220
See application file for complete search history.

(56) References Cited

U.S. PATENT DOCUMENTS

| 5,784,581 | A | 7/1998 | Hannah |
| 6,732,218 | B2 * | 5/2004 | Overtoom et al. .......... 710/313 |
| 6,963,933 | B2 * | 11/2005 | Saito et al. ............. 710/1 |
| 7,028,109 | B2 * | 4/2006 | Saito et al. ............. 710/33 |
| 2004/0088449 | A1 * | 5/2004 | Sakaki .................. 710/15 |
| 2005/0249143 | A1 * | 11/2005 | Tee et al. ............... 370/315 |

FOREIGN PATENT DOCUMENTS

| JP | 11-32071 | 2/1999 |
| JP | 2001-256172 A | 9/2001 |
| JP | 2003-509955 | 3/2003 |
| JP | 2003-318926 | 11/2003 |
| JP | 2003-318926 A | 11/2003 |
| JP | 2003-348109 A | 12/2003 |
| WO | WO 01/20835 A1 | 3/2001 |

OTHER PUBLICATIONS

On-The-Go Supplement to the USB 2.0 Specification Revision 1.0 Dec. 18, 2001.*
Understanding USB On-The-Go, design features, Kosta Koeman Nov. 22, 2001.*
Structured Computer Organization, Third ebition, Andrew S Tanenbaum, 1976.*
ASICSws USB On-The-Go IP Core, May 17, 2003.*
Japanese Office Action issued in corresponding Japanese Patent Application No. JP 2004-016623, Dated Aug. 16, 2006.
Japanese Office Action issued in corresponding Japanese Patent Application No. JP 2004-016623, dated Apr. 10, 2007.

* cited by examiner

*Primary Examiner*—Paul R. Myers
(74) *Attorney, Agent, or Firm*—McDermott Will & Emery LLP

(57) ABSTRACT

Apparatus information as to all of communication apparatus which are connected to a USB data communication apparatus 200 selectably switching a master function and a slave function is acquired in a storage area 225 in a batch manner.

11 Claims, 9 Drawing Sheets

DATA COMMUNICATION SYSTEM

BACKGROUND OF THE INVENTION

1. Field of the Invention

The present invention is related to a data communication method of a USB data communication apparatus capable of selectively switching a master function and a slave function.

2. Description of the Related Art

Very recently, USB data communication apparatus operable in accordance with the USB OTG (Universal Serial Bus On-The-Go) specification have been developed. In the USB OTG specification, between 2 sets of USB data communication apparatus directly connected to each other, such a USB mother/daughter relationship as a "master" and a "slave" may be arbitrarily exchanged without changing connections of cables.

FIG. 8 is a diagram for showing a schematic arrangement of a conventional USB system in which USB data communication apparatus (namely, both USB data communication apparatus 600 and 620) as connected which are operable in accordance with the USB OTG specification. In a USB system operable in accordance with the USB OTG specification, an appliance to which a MINI-A plug of a USB cable is inserted firstly becomes a "master (A-Device)", whereas another appliance to which another MINI-B plug of the USB cable is inserted firstly becomes a "slave (B-Device)", while these appliances are operated.

Next, a description is made of a data transfer operation of the USB system with employment of the above-explained arrangement. FIG. 9 is a sequence diagram for indicating a sequential operation of the data transfer operation executed in the conventional USB system operable in accordance with the USB OTG specification. In the case that the MINI-A plug of the USB cable is inserted into a MINI-AB receptacle 630 of the USB data communication apparatus 600 and the MINI-B plug of the USB cable is inserted into a MINI-AB receptacle 640 of the USB data communication apparatus 620, and thus, a "master" appliance and a "slave" appliance are determined (step S600). The USB data communication apparatus 600 which becomes the master appliance acquires apparatus information (various sorts of information such as configuration, end point (will be referred to as "EP" hereinafter), OTG, descripter etc.) of the USB data communication apparatus 620 functioning as the slave appliance by using an FP0 (step S601). As a result, a data transfer operation is commenced between the USB data communication apparatus, while EP other than EP0 is used (step S602).

During USB data communication, in the case that the "master" appliance and the "slave" appliance are switched between the USB communication apparatus (step S610), after the USB data communication apparatus 620 which has just become the "master" appliance acquires apparatus information of the USB communication apparatus 600 which has just become the "slave" appliance (step S611), the USB data communication apparatus 620 starts a data transfer operation by using EP other than EP0 (step S612). As a consequence, even in such a case that a switching operation between the "master" appliance and the "slave" appliance again occurs (step S620), and thus, the present master/slave relationship is returned to the original master/slave relationship, the USB data communication apparatus 600 again acquires the apparatus information from the USB data communication apparatus 620 (step S621), and then, commences a data transfer operation (step S622).

It should be understood that in the USB OTG specification, since a switching operation of master/slave relationships is carried out after a USB bus has been transferred to a suspend status, suspend statuses are produced time master and slave appliances are switched.

On the other hand, other USB systems have been proposed (for instance, refer to Japanese Laid-open Patent Application 2001-256172 (page 5, FIG. 1)). That is, while the USB systems are arranged by a plurality of standard USB hosts (namely, appliances equipped with only USB host functions) and a plurality of USB devices (namely, appliances equipped with only USB device functions), the USB devices which are being used by the respective standard USB hosts may be used by other USB hosts without switching connections, if necessary. Even in such a USB system, when a "master" appliance and a "slave" appliance are switched, a USB data communication apparatus on the side of the "master" appliance acquires apparatus information from a USB data communication apparatus on the side of the "slave" apparatus, and thus, there are some cases that the above-described duplicated operations of acquiring the apparatus information are carried out.

As previously explained, in the conventional USB systems, every time the switching operations between the master and slave appliances are carried out, since the master-sided USB data communication apparatus acquires the apparatus information of the slave-sided USB data communication apparatus, a large number of redundant operations (namely, operations for acquiring apparatus information are carried out in duplicating manner) are performed in the USB systems in which the "master" appliance and the "slave" appliance are frequently switched.

Also, in the USB OTG specification, there is such a problem that a master/slave switching operation cannot be carried out in a data transfer operation via a standard hub. Also, when a master appliance and a slave appliance are switched, since a USB bus is brought into a suspend condition, there is another problem that a flexible setting operation cannot be carried out. That is, in the flexible setting operation, the master/slave appliance switching operation is carried out at arbitrary timing and/or in synchronism with an application program.

SUMMARY OF THE INVENTION

The present invention has an object to provide a data communication method capable of solving the above-described problems when a master function and a slave function are selectively switched.

A data communication method, according to the present invention, is featured by that in a data communication method of a USB data communication apparatus capable of selectively switching a master function and a slave function, the data communication method of the USB data communication apparatus, is comprised of: a step for acquiring apparatus information as to all of communication apparatus which are connected to the USB data communication apparatus in a batch manner, or a dividing manner. In accordance with this arrangement, the apparatus information as to all of the communication apparatus connected to the USB data communication apparatus is acquired in either the batch manner or the dividing manner. Then, the acquired apparatus information is held, so that as to the held apparatus information, the master-sided USB data communication apparatus need not acquire the apparatus information from the slave-sided USB data communication apparatus every time the master apparatus and the slave apparatus are switched.

Further, the data communication method is further comprised of a step for notifying the apparatus information acquired by the USB data communication apparatus to a newly connected USB data communication apparatus. In accordance with this arrangement, all of the USB data communication apparatus which are connected in a tree structure of USB can commonly use the apparatus information.

In accordance with the present invention, the above-described apparatus information includes a discripter which is used in a USB communication. In accordance with this arrangement, the USB data communication apparatus which has been switched to the master apparatus can be communicated to the slave-sided USB data communication apparatus by using the discripters (device discripter, configuration discripter, interface discripter, end point discripter etc.) which are held by the apparatus information even if this master-sided USB data communication apparatus does not acquire the apparatus information of the slave-sided USB data communication apparatus.

In accordance with the present invention, the above-described apparatus information includes a device address which is used in a USB communication. In accordance with this arrangement, the USB data communication apparatus which has been switched to the master apparatus can use the value of the device address as any value other than 0 by using the device address which is commonly used between the USB data communication apparatus even if the master-sided USB data communication apparatus does not use the USB standard request.

Further, the data communication method is further comprised of: a step for deleting the apparatus information either after the USB data communication is accomplished, or after a USB cable is cut off. In accordance with this structure, until the USB data communication is accomplished, or the USB cable is cut off, either the master apparatus or the slave apparatus can be switched without requiring the acquisition of the apparatus information. Also, after the USB data communication is accomplished, or the USB cable is cut off, the apparatus information is deleted, so that the storage region can be effectively utilized.

A data communication method of the present invention is featured by that in a data communication method of a USB data communication apparatus capable of selectively switching a master function and a slave function, the data communication method is comprised of: a step for sending out a specific pattern onto a data line of a USB cable which is connected to the USB data communication apparatus so as to grasp either a status of the master function or a status of the slave function of the USB data communication apparatus, and also, to request a switching operation of either the master function or the slave function. Also, a data communication method of the present invention is featured by that in a data communication method of a USB data communication apparatus capable of selectively switching a master function and a slave function, the data communication method is comprised of: a step for grasping either a status of the master function or a status of the slave function of the USB data communication apparatus, and also, for requesting a switching operation of either the master function or the slave function by way of a data communication other than a USB data communication. In accordance with this arrangement, grasping either the status of the master function or the status of the slave function of the USB data communication apparatus, and also, requesting the switching operation of either the master function or the slave function are carried out by way of the data communication other than a USB data communication, or by the specific pattern on the data line of the USB cable. As a result, the master apparatus, or the slave apparatus can be switched without via the standard USB hub.

In the present invention, both grasping of the status of either the master function or the slave function and requesting of switching the master/slave functions are carried out from a slave-sided USB data communication apparatus to a master-sided USB data communication apparatus. In accordance with this arrangement, either the master apparatus switching request or the slave apparatus switching request can be issued under control of Vbus, or the like, and either the mater apparatus switching requests or the slave apparatus switching requests can be made from all of the USB data communication apparatus.

Also, a data communication method of the present invention is featured by that in a data communication method of a USB data communication apparatus capable of selectively switching a master function and a slave function, the data communication method is comprised of: a step for switching either the master function or the slave function in a sequence which is set every the USB data communication apparatus so as to execute a data communication. Also, the data communication method is further comprised of: a step for dynamically setting a switching operation of either the master function or the slave function. In accordance with this arrangement, since the either the master apparatus switching operation or the slave apparatus switching operation can be carried out in the sequence which has been arbitrarily set every USB data communication apparatus, either the master apparatus or the slave apparatus can be switched at arbitrary timing, and in synchronism with the application program.

In accordance with the present invention, since the apparatus information of all of the communications apparatus connected to the USB data communication apparatus is acquired in the batch manner, the apparatus information related to the USB data communication operation is exchanged only one time, and thereafter, the USB data communication apparatus on the master side need not acquire the apparatus information from the USB data communication apparatus on the slave side every time the master apparatus and the slave apparatus are switched. As a result, the switching operation of either the master apparatus or the slave apparatus can be quickly carried out.

DESCRIPTION OF THE PREFERRED EMBODIMENTS

Embodiment Mode 1

Figure 1:
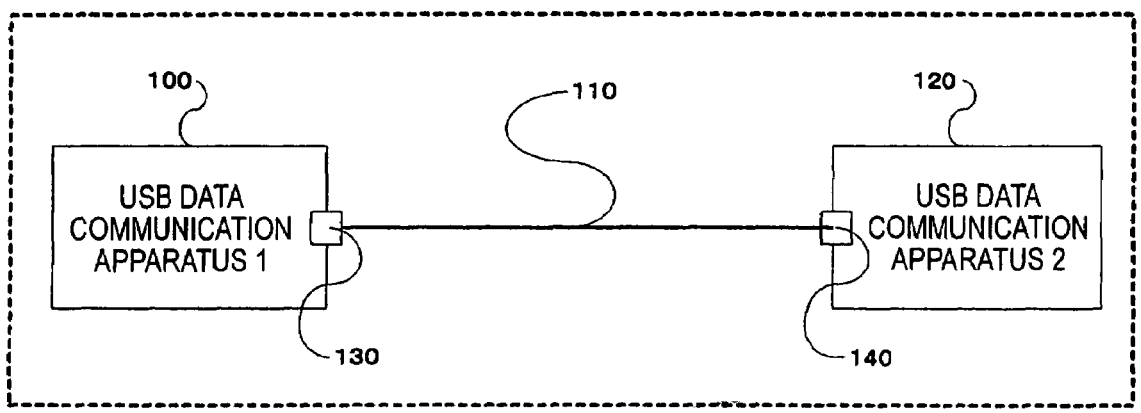
FIG. 1 is a diagram for indicating a schematic arrangement of a USB system.

FIG. 1 is a diagram for representing a schematical arrangement of a USB system for performing a data communication operation, according to an embodiment mode 1 of the present invention. The USB system is arranged by USB data communication apparatus 100 and 120, and a USB cable 110. The USB cable 110 is connected to the USB data communication apparatus 100 and 120. The USB system executes a USB data communication operation by employing a USB protocol. In the respective USB data communication apparatus 100 and 120, MINI-AB receptacles 130 and 140 used to connect the USB cable 110 are provided. A USB data communication apparatus to which a MINI-A plug is inserted constitutes a master apparatus (A-Device), whereas another USB data communication apparatus to which a MINI-B plug is inserted constitutes a slave apparatus (B-Device).

Figure 2:
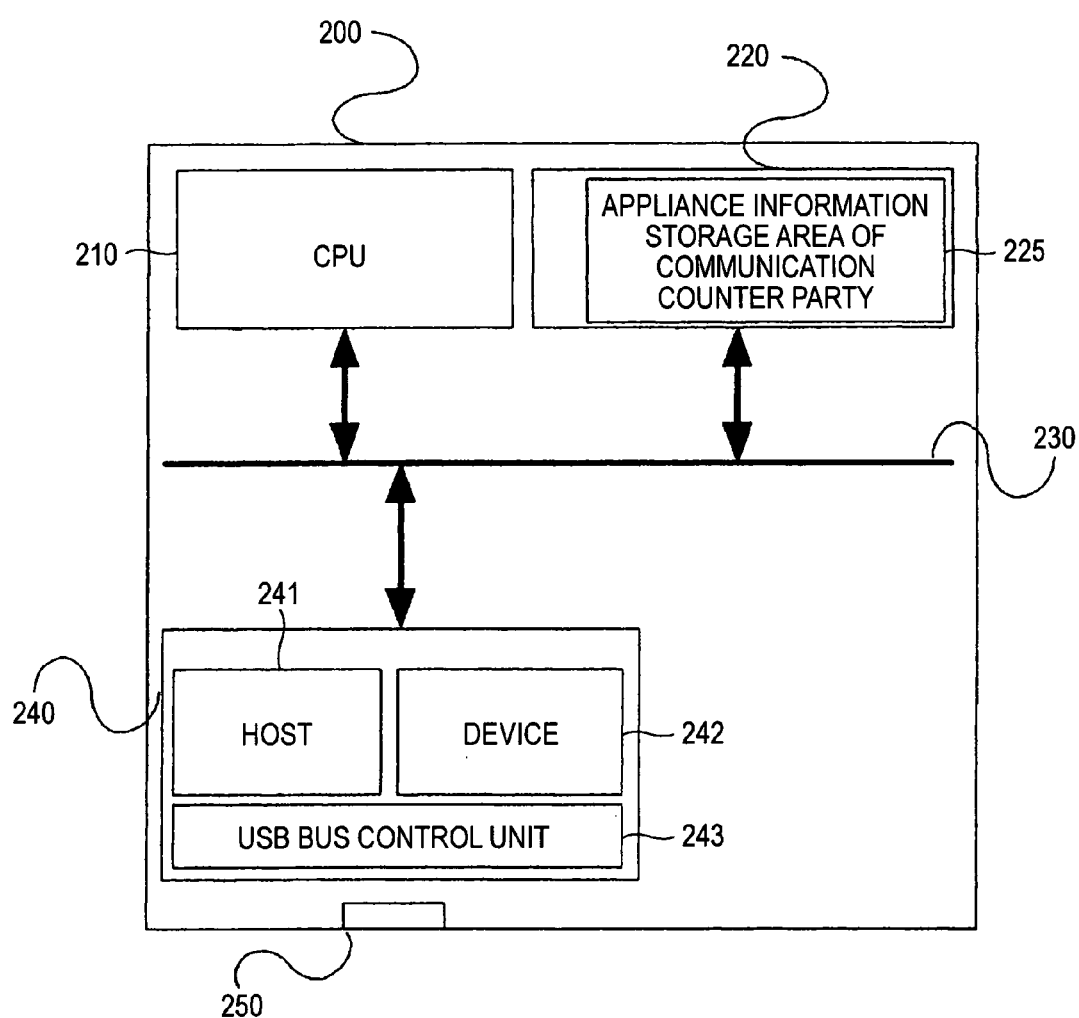
FIG. 2 is a diagram for showing an internal arrangement of a USB data communication apparatus.

FIG. 2 is a diagram for indicating an internal arrangement of a USB data communication apparatus 200. The USB data communication apparatus 200 is equipped with a CPU (Central Processing Unit) unit 210, a storage medium 220, a system bus 230 for connecting the respective units of the USB data communication apparatus 200, a USB unit 240, and a USB port 250 which contains the above-described MINI-AB receptacles.

The CPU unit 210 corresponds a block for controlling an entire unit of the USB data communication apparatus 200. The storage medium 220 corresponds to a memory which has an area for storing thereinto a program, and a rewritable area which is used by the program, and contains a storage area 225 for storing thereinto apparatus information of a communication counter party.

The USB unit 240 is further constituted by a Host 241, a Device 242, and a USB control unit 243. The Host 241 takes a function of a master, and the Device 242 takes a function of a slave in a USB communication. The USB bus control unit 243 manages and controls statuses of USB bus signals (data line D+/D−, Vbus, and Id line of USB cable). Transmitting/receiving operations of USB data packets are carried out by either the Host 242 or the Device 242. The outputting operations of the USB data packets to the data lines are necessarily carried out via the USB bus control unit 243. Also, the USB bus control unit 243 manages that any one of the Host 241 and the Device 242 is used. As to transmitting/receiving operations, the USB bus control unit 243 manages a direction under control of either the Host 241 or the Device 242.

In the case that the USB data communication apparatus 200 is firstly operated as a "master" apparatus, apparatus information of a USB data communication apparatus functioning as a "slave" apparatus is stored in the apparatus information storage area 225 of the communication counter party. As to connections of USB appliances, since these USB appliances are connected to each other under tree conditions while the "master" appliance is located at a center of the appliance connections, all of the apparatus information as to the apparatus to be connected is stored in the USB data communication apparatus 200 of the "master" appliance. The apparatus information which has been stored may be notified as the apparatus information of the USB data communication apparatus of the "master" appliance to another "slave"-sided USB data communication apparatus which is connected to a "slave"-sided USB data communication appliance to be connected by way of a USB cable.

In the case that the USB data communication apparatus 200 is firstly operated as a "slave" apparatus, apparatus information of a USB data communication apparatus functioning as a "master" apparatus is stored in the apparatus information storage area 225 of the communication counter party. It should be understood that although the apparatus information is transferred to the USB data communication apparatus of the slave apparatus by way of the USB data transfer operation, the apparatus information may be transferred by way of another communication means (will be discussed later). Since the apparatus information is notified to the USB data communication apparatus of the "slave" apparatus, the apparatus information of the appliances which have been connected via the USB cables to each other is exchanged, and thus, the apparatus information can be commonly shared between the USB data communication apparatus. Also, when the USB data communication apparatus of the "slave" apparatus is switched to the "master" apparatus, a data communication operation can be carried out by utilizing the stored apparatus information.

Figure 3:
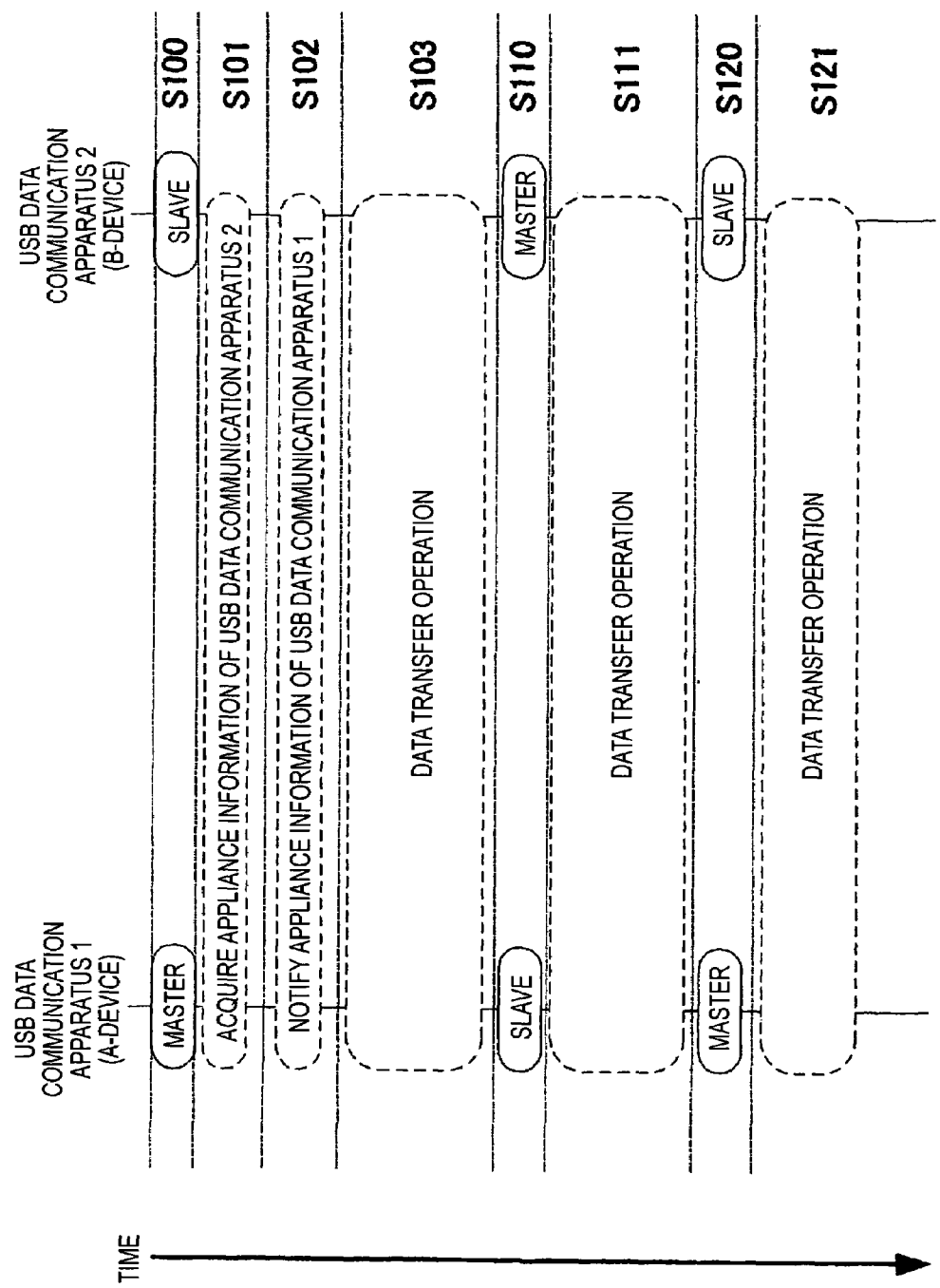
FIG. 3 is a sequence diagram for showing a sequential operation of a data transfer operation.

FIG. 3 is a sequence diagram for indicating a sequential operation of a data transfer operation. When the MINI-A plug of the USB cable 110 is inserted to the USB data communication apparatus 100 and the MINI-B plug of the USB cable 110 is inserted to the USB data communication apparatus 120, both a "master" apparatus and a "slave" apparatus are determined (step S100). In other words, the following condition is set, i.e., in the USB unit 240 of the USB data communication apparatus 100, the Host 241 may function, whereas in the USB unit 240 of the USB data communication apparatus 120, the Device 242 may function. The USB data communication apparatus 100 which becomes the "master" apparatus acquires apparatus information (device, configuration, interface, end point, OTG, descripter etc.) of the USB data communication apparatus 120 as the "slave" apparatus by employing EP0 (step S101). Furthermore, the USB data communication apparatus 100 of the "master" apparatus notifies the apparatus information of the own apparatus to the USB data communication apparatus 120 of the "slave" apparatus (step S102). After the above-described apparatus information has been exchanged, both the USB data communication apparatus 100 and 120 are brought into such a condition that data transfer operations can be carried out by using EP other than EP0 between these USB data communication apparatus 100 and 120 (step S103).

Since the apparatus information of the USB data communication apparatus which constitutes the communication counter party has already been held, even when the switching operation between the master/slave apparatus is carried out during the USB data communication apparatus (step S110 and step S120), the USB data communication apparatus which becomes the master apparatus can commence the data transfer operation while this "master" USB data communication apparatus omits the operation for acquiring the apparatus information of the "slave" USB data communication apparatus (step S111 and step S121).

It should also be understood that in the step (namely, step S102) where the apparatus information of the "master" USB data communication apparatus is notified to the "slave" USB data communication apparatus, since information as to a device address which is used in the data transfer operation is notified, the "master" USB data communication apparatus executes the data transfer operation by using the notified device address in the succeeding steps (namely, step S111 and step S121). As a consequence, while the standard request SetAddress is employed, a sequential operation (USB standard) for changing a device address into any address other than "0" may be omitted. Furthermore, since EP except for EP0 is subsequently used, while the standard request SetConfiguration is employed, a sequential operation for changing a value of configuration into any value other than "0" may be omitted. This reason is given as follows. That is, since the "master" USB communication apparatus has already acquired the apparatus information of the "master" USB communication apparatus, when the switching operation between the master apparatus and the slave apparatus is carried out, such a negotiation that the value of configuration is used as any value except for "0" between the USB data communication apparatus can be carried out. As a result, the master apparatus and the slave apparatus can be switched.

Now, a description is made of a specific pattern which is transferred via a data line. In the USB data communication apparatus 200, the CPU unit 210 controls the USB unit 240 so as to transmit/receive a USB data packet in correspondence with the USB standard. When a USB data packet is received, the USB unit 240 notifies the data reception to the CPU unit 210, and thereafter, the CPU 210 analyzes the received data packet. When the USB data communication apparatus 200 corresponds to a master apparatus, the USB unit 240 enables the Host 241 active, whereas when the USB data communication apparatus 200 corresponds to a slave apparatus, the USB unit 240 enables the Device 242 active, and then, commences transmitting/receiving operations of the USB data packet.

The USB bus control unit 243 detects that the USB data lines (D+/D−) become both "H" (note that both "H" are patterns which are not defined by USB standard), and then, can notify this detection to the CPU unit 210. In response to a request issued by the CPU unit 210, the USB bus control unit 243 outputs both "H" patterns of the USB data lines (D+/D−). As previously explained, while the specific patterns are employed which are transferred via the data lines (D+/D−) of the USB cable, a protocol indicative of an end of a USB data communication can be defined, and a protocol for changing Vbus from "H" to "L" can be defined, and also, a protocol for requesting/notifying a switching operation between a master apparatus and a slave apparatus can be defined between the USB data communication apparatus.

On the other hand, the USB bus control unit 243 detects a cut off of a USB cable, since Vbus of a USB signal is changed from "H" to "L" and an Id line is changed from "L" to "H." When the USB bus control unit 243 detects the cut off of the USB cable, the USB bus control unit 243 notifies the cut off of the USB cable to the CPU unit 210, and then, the CPU unit 210 performs a cut-off process operation. As one of the cut-off process operations, the apparatus information storage area 225 is opened into which the apparatus information of the USB data communication apparatus as the communication counter party has been stored. The apparatus information which becomes unnecessary since the USB cable is cut off is deleted, the storage area 225 is opened, and only the necessary apparatus information is stored in this storage area 225, so that the storage capacity of the storage medium 220 can be saved.

Embodiment Mode 2

Figure 4:
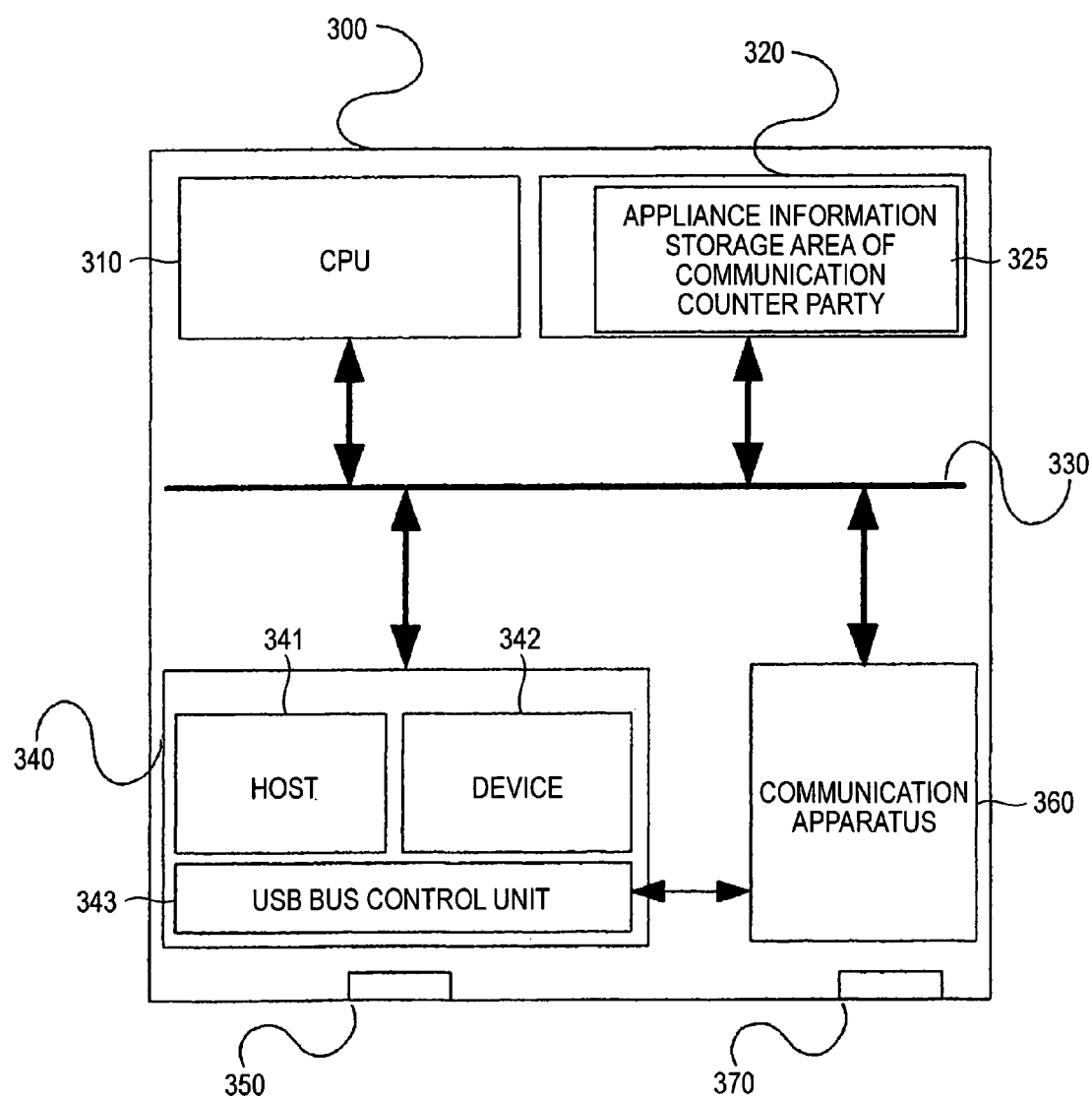
FIG. 4 is a diagram for showing an internal arrangement of a USB data communication apparatus.

An arrangement of a USB system according to an embodiment mode 2 of the present invention is identical to the arrangement shown in FIG. 1 of the embodiment mode 1, namely, is made by that USB data communication apparatus are connected to each other via a USB table. FIG. 4 is a diagram for showing an internal arrangement of a USB data communication apparatus 300 employed in the USB system according to the embodiment mode 2 of the present invention. This USB data communication apparatus 300 is arranged by additionally providing a communication apparatus 360, as compared with the USB data communication apparatus 200 (see FIG. 2) of the USB system in the embodiment mode 1.

The communication apparatus 360 corresponds to a block which takes a function as a communication means other than USB communication between USB data communication apparatus to be connected to each other, namely corresponds to such an apparatus capable of performing a serial communication, Bluetooth (trademark), a parallel communication, and the like. The USB data communication apparatus 300 performs a data transfer operation other than a USB data transfer operation via the communication apparatus 360 controlled by the CPU unit 310 with respect to a USB data communication apparatus to be connected thereto. It should be understood that since apparatus information may be exchanged in this data transfer operation other than the USB data transfer operation, even if appliance information of a communication counter party is not stored in the storage medium 320, the USB data communication apparatus 300 may be alternatively arranged in such a manner that the appliance information is acquired via the communication apparatus 360 from the communication counter party, if necessary.

Also, when the communication apparatus 360 detects a certain specific pattern in transmitting/receiving operations, the communication apparatus 360 controls the USB bus control unit 343 without via the CPU 310 so as to switch the master/slave functions of the USB data communication apparatus 300.

Furthermore, since the communication apparatus 360 determines a protocol, the communication apparatus 360 can execute a control operation of Vbus, and a control operation for notifying either a status of a master apparatus or a status of a slave apparatus in addition to a control operation for switching the master/slave functions of the USB data communication apparatus 300. For instance, if such a protocol is defined between USB data communication apparatus, in which when "0xFF" is detected in a serial transfer operation, master/slave functions are switched, then various sorts of control operations can be carried out. That is to say, if a protocol indicative of an end of a USB data communication is defined; a protocol for changing Vbus from "H" to "L" is defined; and a protocol capable of defining a switching request notification of master/slave functions is defined, then various sorts of control operations can be carried out.

Embodiment Mode 3

Figure 5:
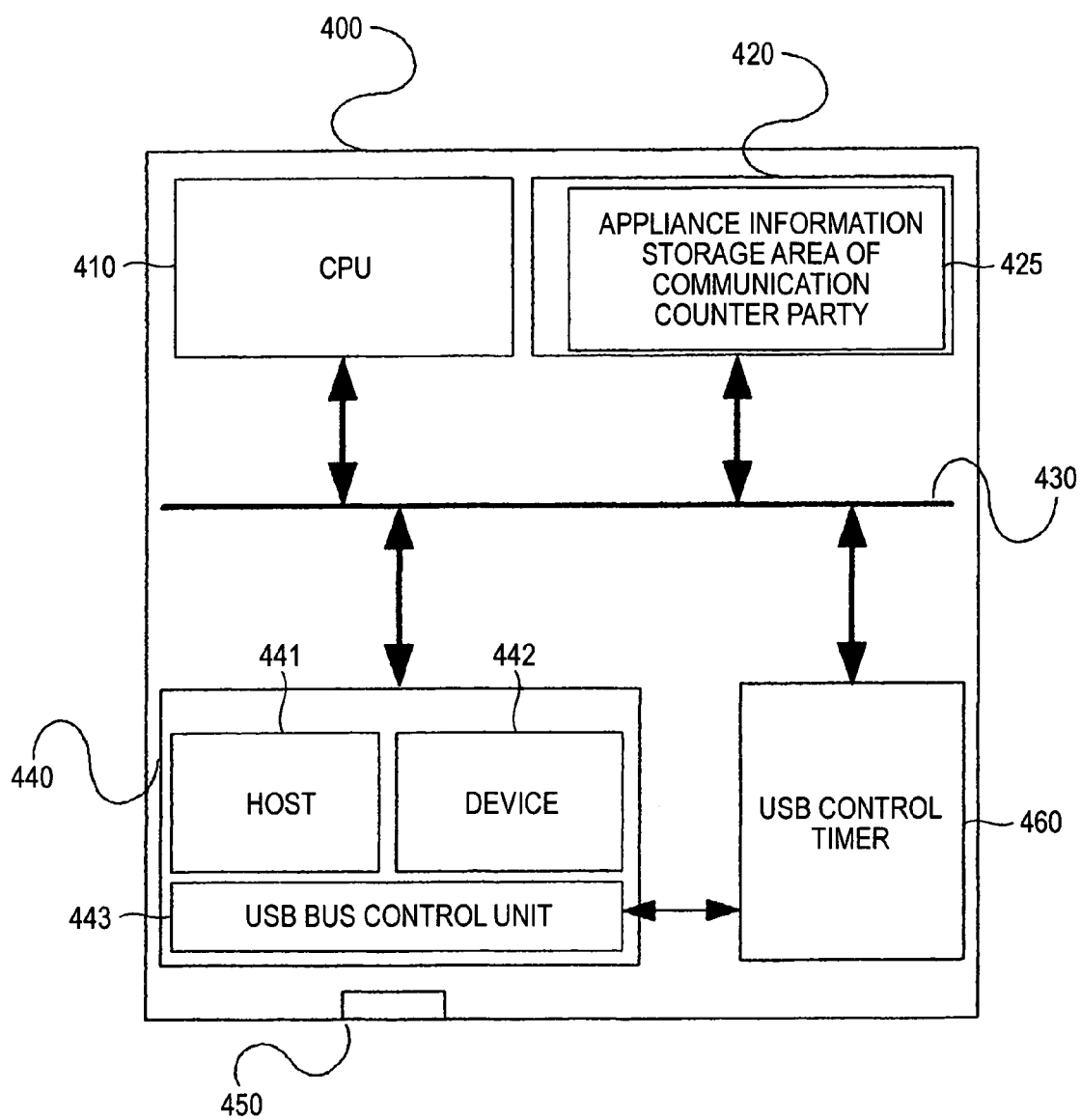
FIG. 5 is a diagram for showing an internal arrangement of a USB data communication apparatus.

An arrangement of a USB system according to an embodiment mode 3 of the present invention is identical to the arrangement shown in FIG. 1 of the embodiment mode 1, namely, is made by that USB data communication apparatus are connected to each other via a USB table. FIG. 5 is a diagram for showing an internal arrangement of a USB data communication apparatus 400 employed in the USB system according to the embodiment mode 3 of the present invention. This USB data communication apparatus 400 is arranged by additionally providing a USB bus control timer 460, as compared with the USB data communication apparatus 200 (see FIG. 2) of the USB system in the embodiment mode 1.

The USB bus control timer 460 manages time during which the USB data communication apparatus 400 is operated as either a master apparatus or a slave apparatus. A CPU unit 410 may schedule to arbitrarily set a time of the master apparatus and a time of the slave apparatus with respect to the USB bus control timer 460. The USB bus control timer 460 counts a time based upon SOF (1 msec) for transmission/reception by the USB unit 440. When the USB data communication apparatus 400 enables the Host 441 active, the USB bus control timer 460 counts a time of the master apparatus, whereas when the USB data communication apparatus 400 enables the Device 442 active, the USB bus control timer 460 counts a time of the master apparatus. The CPU unit 410 may alternatively change a setting condition during counting operation.

When the USB bus control timer 460 counts SOF for a set time, the USB bus control timer 460 controls the USB unit 440 so as to switch either the master status or the slave status of the USB data communication apparatus 400. In the case that the USB bus control timer 460 cannot detect SOF for a longer time than the time defined by the USB standard, time out of SOF is detected by an internal timer held by the USB bus control timer 460 and the USB bus control timer 460 counts. As a result, the information related to either the master status or the slave status of the USB data communication apparatus can be commonly used between the USB data communication apparatus to be connected to each other, and the respective USB data communication apparatus can switch the master/slave functions in synchronism with each other. In other words, both the switching operation by which the "master" USB data communication apparatus is switched to the "slave" USB data communication apparatus, and the switching operation by which the "slave" USB data communication apparatus is switched to the "master" USB data communication apparatus can be carried out at the same time.

Also, in a USB data communication apparatus operated in accordance with the USB OTG specification, since the negotiation protocol defined in the USB OTG specification is carried out, the master/slave switching operations can be readily carried out.

Embodiment Mode 4

Figure 6:
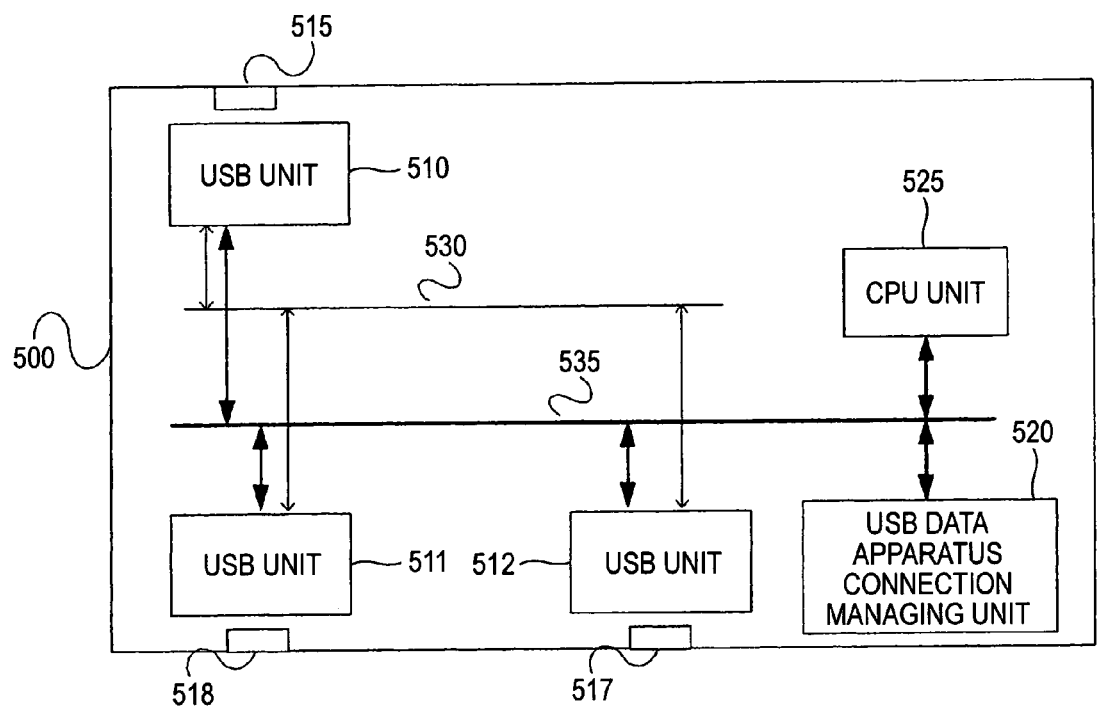
FIG. 6 is a diagram for showing an internal arrangement of a USB data communication apparatus.

A schematic arrangement of a USB system according to an embodiment mode 4 of the present invention is identical to the arrangement shown in FIG. 1 of the embodiment mode 1, namely, is basically made by that USB data communication apparatus are connected to each other via a USB table. FIG. 6 is a diagram for showing an internal arrangement of a USB data communication apparatus 500 employed in the USB system according to the embodiment mode 4 of the present invention. This USB data communication apparatus 500 is mainly arranged 3 sets of USB units 510, 511, 512; a USB data apparatus connection managing unit 520; a CPU unit 525; a USB data line 530; a system bus 535; and the like.

The USB data apparatus connection managing unit 520 manages sorts of communication-counter-sided apparatus (standard host, standard device, apparatus operable under USB OTG specification, USB data communication apparatus of the present invention, and the like); the present communication-counter-sided apparatus; a status (master, or slave function) of the own apparatus (USB data communication apparatus 500); connections between the USB signal line and each of the USB units 510, 511, 512; and the like.

Figure 7:
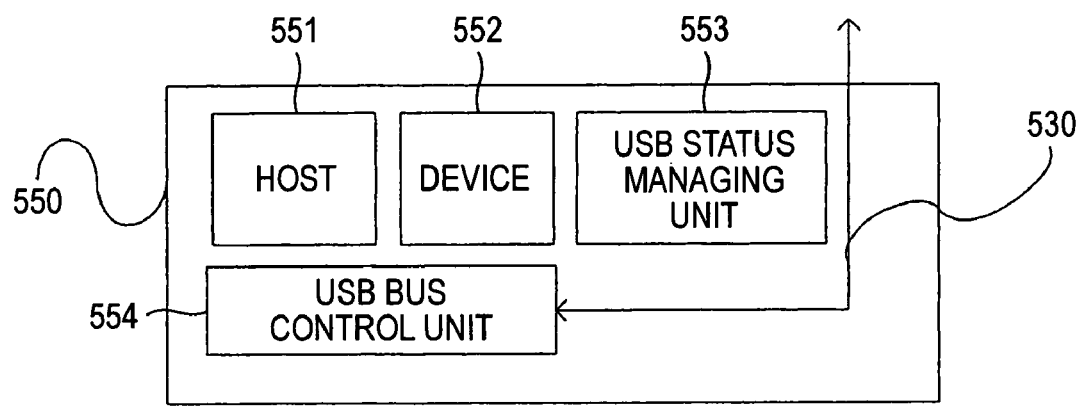
FIG. 7 is a diagram for indicating an internal arrangement of each of USB units which are provided at three places in the USB data communication apparatus.
Figure 8:
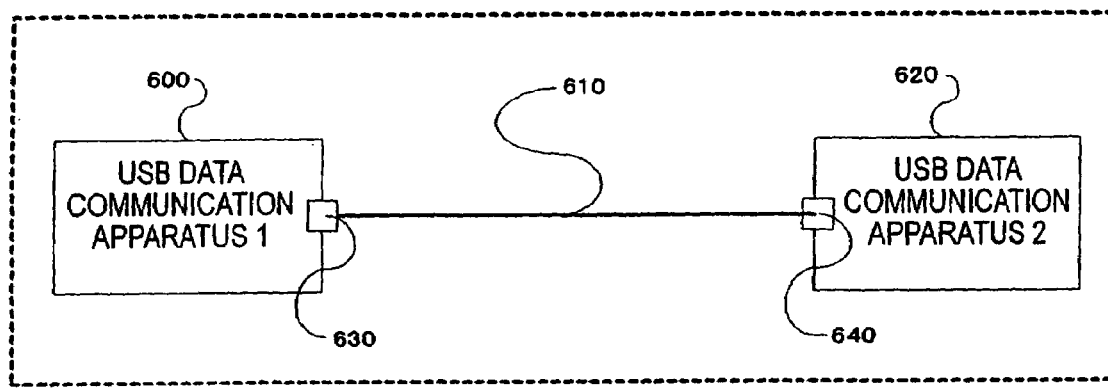
FIG. 8 is a diagram for indicating the schematic structure of the conventional USB system to which the USB data communication operable in accordance with the USB OTG specification is connected.
Figure 9:
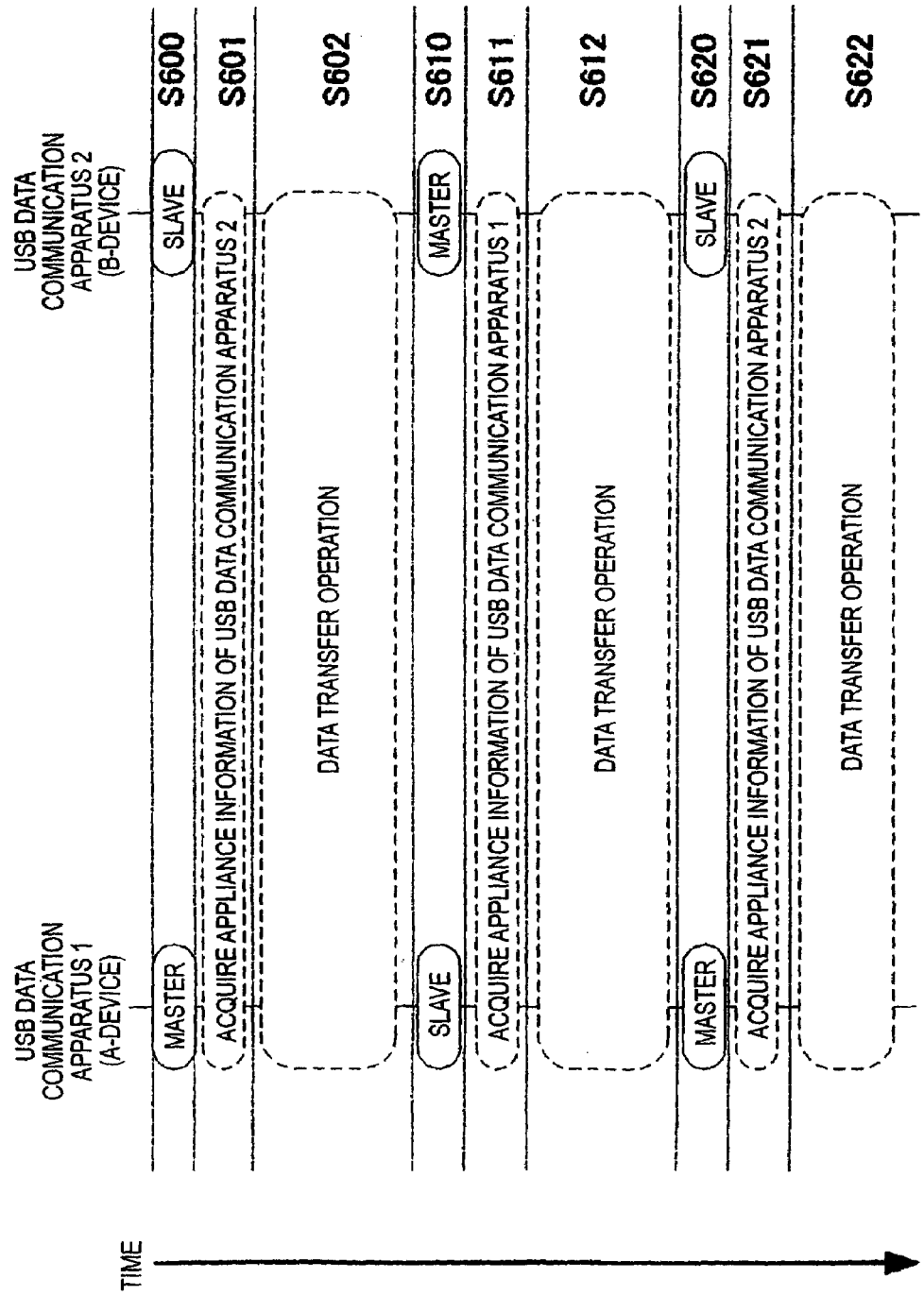
FIG. 9 is a sequence diagram for indicating the sequence of the data transfer operation executed in the conventional USB system operable in accordance with the USB OTG specification.

FIG. 7 is a diagram for indicating an internal arrangement of one of the USB units 510, 511, 512, which are provided at three places of the USB data communication apparatus 500 of the USB system according to the embodiment 4 of the present invention. A USB bus unit is constituted by a Host 551, a Device 552, a USB status control unit 553, and a USB bus control unit 554.

The USB bus control unit 554 manages that either the Host 551 or the Device 552 transmits and receives a USB data packet via the USB data line 530. While each of the USB units 510, 511, 512 employed in the USB data communication apparatus 500 is connected to the USB data line 530 so as to be communicated to an external USB data communication apparatus, either the Host 551 or the Device 552 of any one of the USB units 510, 511, 512 employed in the USB data communication apparatus 500 controls the USB bus control unit 544. Then, the USB bus control unit 544 which is connected to any one of the Host 551 and the Device 552 controls the USB bus control units 554 of the remaining USB units, and the Hosts 551 and the Devices 552 provided in the remaining USB units do not function. As a consequence, the function of the standard USB hub may be realized. The USB status managing unit 553 manages a status (either master or slave status) of the USB unit 550.

Next, a description is made of operations in such a case that the standard host, the standard device, the appliance operable under USB OTG specification, and the USB data communication apparatus are connected to the above-described USB data communication apparatus 500.

In such a case that the standard host is connected to the USB data communication apparatus 500, the USB unit 550 registers information to the USB data apparatus connection managing unit 520, and notifies the registered information to the CPU unit 525. The CPU unit 525 performs a data communication with the standard host by employing the Device 552 of the USB unit 550, and determines a connection schedule of the standard host. Thereafter, the CPU unit 525 registers the information to the USB data apparatus connection managing unit 520, and controls the Device 552 of the USB unit 550 so as to perform a data communication. In the case that the standard host can be operated as a "master" appliance, the USB data apparatus connection managing unit 520 connects the USB unit 550 to the USB data line 530. As a result, the CPU unit 525 can perform a data communication operation with a USB appliance which is additionally connected thereto. In the case that the standard host functioning as the master appliance is returned to a slave appliance, the USB data apparatus connection managing unit 520 cuts off the USB data line 530. As a result, the slave appliance is arranged to perform a data communication by controlling the Device 552 of the USB unit 550, and thus, is managed by the CPU unit 525.

In such a case that the standard device is connected to the USB data communication apparatus 500, the USB unit 550 registers information to the USB data apparatus connection managing unit 520, and notifies the registered information to the CPU unit 525. When a master apparatus is present, the USB data apparatus connection managing unit 520 connects the relevant USB unit 550 to the USB data line 530, whereas when the master apparatus is not present, the USB data apparatus connection managing unit 520 cuts off the connection between the relevant USB unit 550 and the USB data line 530.

In such a case that the appliance operable under USB OTG specification is connected to the USB data communication apparatus 500, the USB unit 550 registers information to the USB data apparatus connection managing unit 520, and notifies the registered information to the CPU unit 525. The CPU unit 525 notifies either a status of a master apparatus or a status of a slave apparatus to the USB data apparatus connection managing unit 520. When the above-described USB OTG-specification appliance is connectable to the USB data communication apparatus 500, the USB data apparatus connection managing unit 520 connects the USB unit 550 to the USB data line 530. Also, in the case that the USB OTG-specification appliance cannot be connected to the USB data line 530 by an external USB appliance, the USB status managing unit 553 executes a host negotiation protocol defined by the OTG specification, and switches either a master status or a slave status of a USB data communication apparatus which is connected to the USB data communication apparatus 500. After the master/slave statuses are switched, the USB status managing unit 553 notifies this status switching operation to the CPU unit 525. The CPU unit 525 registers the notified status switching operation to the USB data apparatus connection managing unit 520, and then, the USB unit 550 is connected to the USB data line 530 under management of the USB data apparatus connection managing unit 520.

When master/slave functions are switched between USB data communication apparatus, the USB data apparatus connection managing unit 520 cuts off the USB unit to which the USB OTG-specification appliance is connected from the USB data line 530. The CPU unit 525 initializes (namely, connected condition) the OTG-specification appliance from the USB unit, and then, notifies this initialization to the USB data apparatus connection managing unit 520.

In the case that the USB data communication apparatus of the prevent invention is connected to the USB data communication apparatus 500, the USB unit 550 registers information to the USB data apparatus connection managing unit 520, and notifies the registered information to the CPU unit 525. The CPU unit 525 determines a schedule and then registers the determined schedule to the USB data apparatus connection managing unit 520. Thereafter, until the USB cable is cut off, the USB data communication apparatus 520 performs a data transfer operation while switching the master/slave apparatus under management of the USB data apparatus connection managing unit 520.

As previously described, even in such a USB system in which 3 sets, or more sets of USB data communication apparatus are connected, the master apparatus and the slave apparatus can be switched. Since the conventional USB appliance (only master appliance, or only slave appliance) can be connected among the USB data communication apparatus, the USB data communication apparatus of the present invention can be utilized without restricting utilizations.

The data communication method of the present invention owns the following effect. That is, since the apparatus information of all of the communications apparatus connected to the USB data communication apparatus is acquired in the batch manner, the apparatus information related to the USB data communication operation is exchanged only one time, and thereafter, the USB data communication apparatus on the master side need not acquire the apparatus information from the USB data communication apparatus on the slave side every time the master apparatus and the slave apparatus are switched. As a result, the switching operation of either the master apparatus or the slave apparatus can be quickly carried out. The data communication method of the present invention can be effectively used as the data communication technique of the USB data communication apparatus which can selectably switch the master function and the slave function.

What is claimed is:

1. A data communication method for a plurality of USB data communication apparatus connected to each other and capable of selectively switching a master function and a slave function; comprising the steps of:

acquiring, by each of the USB data communication apparatus in a single batch manner, apparatus information as to all of the USB data communication apparatus appears which are connected.

2. The data communication method as claimed in claim 1, further comprising the steps of:

notifying the apparatus information acquired by the USB data communication apparatus to a newly connected USB data communication apparatus.

3. The data communication method as claimed in claim 1, wherein:

the apparatus information includes a discripter which is used in a USB communication.

4. The data communication method as claimed in claim 1, wherein:

the apparatus information includes a device address which is used in a USB communication.

5. The data communication method as claimed in claim 1, further comprising the steps of:

deleting the apparatus information either after the USB data communication is accomplished, or after a USB cable is cut off.

6. A data communication method of a USB data communication apparatus capable of selectively switching a master function and a slave function, comprising the steps of:

grasping either a status of the master function or a status of the slave function of the USB data communication apparatus;

requesting a switching operation of either the master function or the slave function by way of a data communication other than a USB data communication.

7. The data communication method as claimed claim 6 wherein:

both grasping of the status of either the master function or the slave function and requesting of switching the master/slave functions are carried out from a slave-sided USB data communication apparatus to a master-sided USB data communication apparatus.

8. A USB data communication apparatus comprising:

control means for executing the step recited in the data communication method as claimed in any one of claim 1 to claim 5, claim 6, and claim 7.

9. An integrated circuit comprising: the control means recited in claim 8.

10. A program for causing a computer to execute the step recited in the data communication method as claimed in any one of claim 1 to claim 5, claim 6, and claim 7.

11. A computer readable storage medium wherein:

the program recited in claim 10 has been stored thereinto.

* * * * *